June 21, 1966     S. SMITH     3,256,633
FISH LINE HOLDER FOR CASTING RODS
Filed Aug. 19, 1964
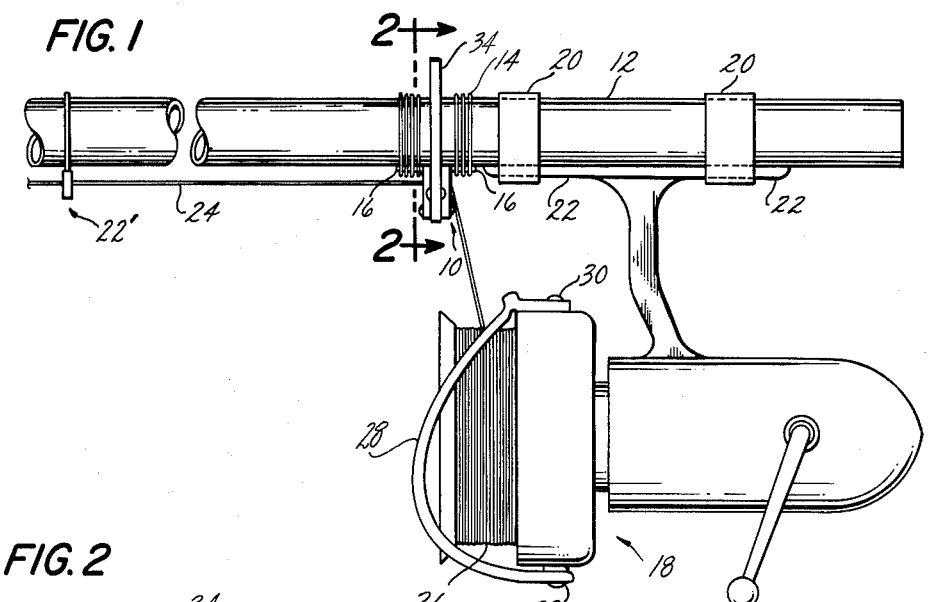
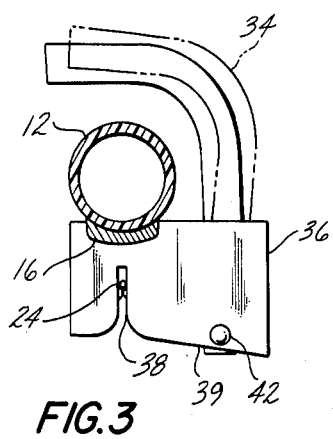
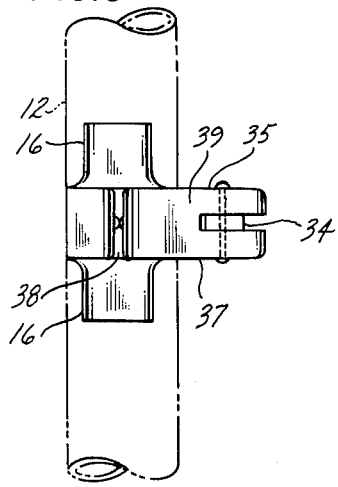
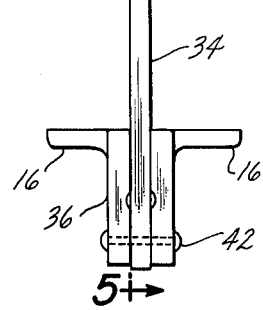
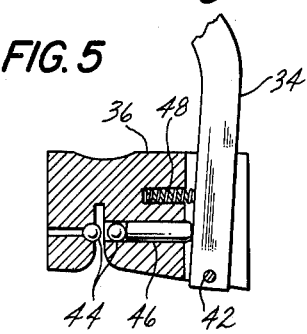
INVENTOR.
STANLEY SMITH
BY *McCormick, Paulding & Huber*
ATTORNEYS

United States Patent Office 3,256,633
Patented June 21, 1966

3,256,633
FISH LINE HOLDER FOR CASTING RODS
Stanley Smith, Prospect Hill, Rte. 5,
Warehouse Point, Conn.
Filed Aug. 19, 1964, Ser. No. 390,554
6 Claims. (Cl. 43—25)

This invention relates generally to accessories for the angler, and deals more particularly with a fish line holder adapted for use with a casting rod having a casting reel mounted thereon and having a plurality of fish line guide eyelets at spaced locations along the rod.

The general object of the present invention is to provide a holder which will allow the angler to make a cast without having to use his thumb or forefinger to hold the line during the preliminary part of the cast, thereby avoiding injury to these fingers due to the moving line as it is paid off the reel.

Still another object of the present invention is to provide a holder for a casting line which will improve the accuracy of the angler's cast by decreasing the unpredictable gyrations of the line segment between the reel and the first eyelet during a normal cast.

Still another object of the present invention is to provide a holder for a casting line which holder is of relatively simple construction and is inexpensive to manufacture and which holder can also be quickly and easily attached to a fishing rod by means familiar to the average angler.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 shows a fish line holder of the present invention mounted on a casting rod between a conventional casting reel and a typical fish line guide eyelet.

FIG. 2 is an elevational view of the holder of FIG. 1 and shows the rod and a part of the holder in section, being taken along the line 2—2 of FIG. 1.

FIG. 3 is a view from below the holder of FIG. 1 showing the rod in broken lines.

FIG. 4 is a side view of the holder shown in FIG. 1.

FIG. 5 is a sectional view of the holder of FIG. 1 and is taken along the line 5—5 of FIG. 4.

Turning now to the drawings in greater detail, FIG. 1 shows a holder 10 of the present invention attached to a casting rod 12 by two lengths of twine or the like indicated generally at 14, 14 which are each wound around the rod and around an ear 16 on the holder 10. A conventional casting reel, indicated generally at 18, is also mounted on the rod 12 by a pair of annular bands 20, 20 which are slidably received on the rod and adapted to encircle the two ears 22, 22 provided therefor on the reel 18. A fish line guide eyelet, indicated generally at 22', is also mounted on the rod by any conventional means and several of these eyelets may be used in a conventional manner at spaced locations along the rod 12. The line 24 is wound around the spool as shown at 26 and may pass behind a bail 28 and through the eyelet 22' in a conventional manner. The bail 28 is pivotally attached to the reel 18 as shown at 30 and 32, so that the bail can be pivoted into the position shown in FIG. 1 to free the line for a cast.

In a conventional cast, the angler pivots the bail 28 into the position shown in FIG. 1 and hooks his forefinger around the line 24 or clamps the line against the rod with his thumb so that the line will not prematurely pay off the reel 18. In utilizing the holder 10 of the present invention, the angler merely places the line 24 into the holder as shown in FIG. 1 and holds his thumb upon a lever 34 which is a part of the holder. In casting with a rod equipped with a holder of the present invention, the angler merely releases thumb pressure on said lever 34 of the holder 10 at the proper time in the cast to release the line.

Turning now to a more detailed description of the holder 10, FIG. 2 shows this device as comprising a generally rectangular block 36 having front and rear surfaces 35 and 37 and defining a downwardly open channel-shaped groove 38 in its lower surface 39. The groove 38 extends from said front surface 35 to said rear surface 37 and is generally parallel to the rod to receive the line 24 as shown in FIG. 1. Suitable means to be described is provided for selectively closing and opening this groove in response to movement of the lever 34. As shown in FIG. 2, a right-hand portion of the block 36 extends outwardly from beneath the rod 12 and the lever 34 is pivotally connected to said block adjacent the lower surface 39. The lever 34 is movable in a vertical groove 43 about an axis defined by a pivot pin 42 between the solid line position and the broken line position shown in FIG. 2. The lever 34 is of generally inverted L-shape and extends upwardly from the pivot pin 42 so that its upper free end portion can be engaged by the angler's thumb. The pin 42, and the axis defined thereby, are arranged generally parallel to the rod 12.

Preferably, and as shown, the block 36 is constructed integrally with the ears 16, 16 and a concave upper surface extends along each of these ears and along the upper edge of the block 36 to receive the rod 12 as best shown in FIG. 2. As so constructed, the block 36 is well adapted to be die cast in metal or injection molded in a hard plastic material. The groove 38 in the lower surface 39 of said block is preferably formed with laterally flared side portions as shown to facilitate the positioning of the fish line 24 therein. In order to further expedite this positioning of the fish line 24, the lower surface 39 of the block 36 may be inclined slightly as shown in FIG. 2.

Turning now to the means for opening and closing the groove 38, FIG. 5 shows said means as comprising a pair of laterally aligned spherical elements or balls 44, 44 one of which is received in a socket in one side of the groove 38 and the other of which is slidably received in a cylindrical recess defined in the block 36. A plunger 46 is disposed between said movable ball 44 and the lever 34 so as to move this ball against the other said ball in response to movement of the lever 34 in one direction towards a depressed position shown in solid lines in FIG. 2. The lever 34 is biased towards the groove open or release position shown in broken lines in FIG. 2 (and in solid lines in FIG. 5) by a coil spring 48 received in a cylindrical opening in the housing 36. As so arranged, the angler merely releases thumb pressure on the thumb engageable upper portion of the lever 34 during a cast and the spring 48 moves the lever to the FIG. 5 position allowing the taut line 24 to pass between the balls 44, 44. It will be apparent that the balls 44, 44 define a generally V-shaped notch into which the taut line wedges itself during the preliminary part of the cast so that the line cannot prematurely pay off the reel. It should also be noted that once the lever has been released the balls will separate instantaneously avoiding any tendency for the line to become ensnared in the holder during a cast.

The invention claimed is:

1. A holder for a fish line which is adapted for use on a fishing rod having a plurality of fish line guide eyelets and a casting reel mounted thereon, said fish line holder comprising a block, means for mounting said block on said rod, a manually operable lever pivotally connected to said block for movement about an axis which is generally parallel to the said rod, said block defining a generally channel-shaped groove which is also generally parallel to said rod and which is located to receive a segment of the fish line between the reel and an adjacent guide eyelet, and means for selectively closing and opening said groove to respectively retain and release the line in response to movement of said lever.

2. A holder for a fish line as set forth in claim 1 wherein said means for closing and opening said channel-shaped groove comprises a pair of balls each of which is mounted in a side wall of said groove and one of which is adapted to be moved into engagement with the other in response to movement of said lever in one direction.

3. A holder for a fish line as set forth in claim 2 wherein said means for closing and opening said channel-shaped groove further comprises a plunger slidably received in said block for movement towards and away from said groove, one end of said plunger being adapted to engage said movable ball and the opposite end of said plunger being engageable by a portion of said lever which is spaced in relation to said pivotal connection whereby movement of said lever in said one direction moves said plunger towards said movable ball.

4. A holder for a fish line which is adapted for use on a fishing rod having a plurality of fish line guide eyelets and a casting reel mounted thereon, said fish line holder comprising a block, a pair of ears integrally formed on said block for mounting the holder on said rod, a manually operable lever pivotally connected to said block for movement about an axis which is generally parallel to said rod, said block defining a generally channel-shaped groove which is also generally parallel to said rod and which is located to receive a segment of the fish line between the reel and an adjacent guide eyelet, a pair of laterally aligned balls each of which is mounted in a socket provided therefor in a side wall of said groove, at least one of said balls being laterally movable into engagement with the other in response to movement of said lever in one direction to close the groove and retain the line therein.

5. A holder for a fish line as set forth in claim 4 and further characterized by a plunger slidably received in said block for movement towards and away from said groove, one end of said plunger which is engageable with said laterally movable ball and the opposite end of said plunger being engageable by a portion of said lever which is spaced in relation to said pivotal connection whereby movement of said lever in said one direction moves said plunger towards said movable ball, and a compression spring acting between said block and said lever for urging the latter in an opposite direction to open the groove and release the line segment.

6. A holder for a fish line which is adapted for use on a fishing rod having a plurality of fish line guide eyelets and a casting reel mounted on one side thereof, said holder comprising a generally rectangular block having front and rear surfaces, two oppositely arranged ears each of which projects outwardly from one of said surfaces adjacent an upper edge of said housing, said outwardly projecting ears and said upper edge of said block defining a concave surface adapted to receive said rod generally perpendicularly with respect to said block, a lever of inverted L-shape pivotally connected at its lower end to said block adjacent the lower edge thereof for limited movement about an axis which is generally parallel to said rod, an upper free end portion of said L-shaped lever which is adapted to be disposed on an opposite side of said rod from said block and which defines a thumb engageable portion at the upper free end thereof, said housing defining a downwardly open channel-shaped groove at said lower edge thereof which groove extends from the front to the rear surface thereof for receiving a segment of the fish line between said reel and an adjacent guide eyelet, laterally aligned balls in sockets provided therefor in the side walls of said groove, at least one of which balls is adapted to be moved towards the other ball to close the groove in response to movement of said lever in one direction, and a compression spring acting between said block and said lever for urging the latter in an opposite direction to open the groove when said lever is released.

No references cited.

SAMUEL KOREN, *Primary Examiner.*

WARNER H. CAMP, *Assistant Examiner.*